Patented Dec. 28, 1948

2,457,279

UNITED STATES PATENT OFFICE 2,457,279

MODIFICATION OF PREFORMED MONO-OLEFIN/CARBON MONOXIDE POLYMERS BY REACTION WITH BASIC COMPOUNDS

Samuel L. Scott, Wilmington, Del., assignor to E. I. du Pont de Nemours & Company, Wilmington, Del., a corporation of Delaware No Drawing. Application January 31, 1945, Serial No. 575,559

20 Claims. (Cl. 260—66)

This invention relates to methods for modifying preformed monoolefin/carbon monoxide polymers.

This invention has for an object the provision of a simple and practical method for modifying the properties of monoolefin hydrocarbon/carbon monoxide polymers. Another object is to provide a method for increasing the solvent and heat-resistance of normally soluble monoolefin hydrocarbon/carbon monoxide polymers. Still another object is to provide a method for increasing the solvent and heat-resistance of normally soluble ethylene/carbon monoxide polymers.

The above and other objects appearing hereinafter are attained by contacting a monoolefin hydrocarbon/carbon monoxide polymer with a minor proportion of a basic compound of the type hereinafter defined, until the desired degree of modification in the properties of the polymer has been obtained.

In one adaption of the invention, an ethylene, carbon monoxide polymer is blended with a minor amount of a basic material and the blend is heated until the polymer becomes insoluble in solvents in which it was originally soluble.

The examples which follow are submitted to illustrate and not to limit this invention. Unless otherwise stated, parts are by weight.

*Example 1.*—An ethylene/carbon monoxide polymer in which the mole ratio of ethylene to carbon monoxide is 1.3:1 is dissolved in dioxolane. Hydrazine hydrate is added and the mixture is heated for 3 days at 90°–100° C. The resulting gel is triturated with water and the product is dried. It does not melt below 205° C. whereas the untreated polymer melts at 116–120° C. Analysis shows it to contain 7.68% nitrogen.

The ethylene/carbon monoxide polymer used above is prepared in the following manner:

A silver-lined pressure reactor is flushed with nitrogen, and charged with 100 parts of water and 0.5 part of benzoyl peroxide. The reactor is closed, evacuated, and pressured to 300 atms. with ethylene and further to 500 atms. with carbon monoxide. The reaction mixture is heated to 100° C. and kept at that temperature for 12 hours while the pressure is held at 856 to 1000 atms. by occasional repressuring with carbon monoxide. The vessel is cooled, bled of excess gases, and opened. The product is steamed and dried. The yield is 20 parts.

*Example 2.*—To a solution of 10 parts of an ethylene/carbon monoxide polymer in which the mole ratio of ethylene to carbon monoxide is 3.1:1 in 250 parts of dioxane is added 4 parts of 85% hydrazine hydrate. After the reaction mixture is heated under reflux for 3 hours the dioxane is removed by steam distillation. There is obtained 9.2 parts of a solid product which is dried under reduced pressure. The product is found to be substantially infusible and insoluble in dioxane and other common organic solvents. Analysis shows it to contain 9.07% nitrogen.

The ethylene/carbon monoxide polymer used above is prepared as follows:

A silver-lined pressure reactor is flushed with nitrogen, charged with 100 parts of dioxane, 0.5 part of benzoyl peroxide, and 1 part of sodium bisulfite, closed, evacuated, and pressured to 450 atms. with ethylene and further to 500 atms. with carbon monoxide. The reaction mixture is heated to 100° C. and kept at that temperature for 12 hours, while the pressure is held at 850–1000 atms. by occasional repressuring with carbon monoxide. The reactor is cooled, bled of excess gases, and opened. The dioxane is removed from the product by distillation with steam and the product is washed with water and dried. The yield of product is 21 parts. It melts at 100–101° C.

*Example 3.*—To 10 parts of a finely divided ethylene/carbon monoxide polymer in which the ethylene/carbon monoxide mole ratio is 1.1:1 is added 10 parts wood flour in sufficient methanol to form a thin slurry. The slurry is milled in a ball mill for 16 hours and then filtered. The dry polymer-wood flour mixture is wet with a solution of 1 part of meta-phenylenediamine in enough ethyl alcohol to form a smooth paste. The alcohol is removed by evaporation and the residue molded into a bar at 150° C. under a pressure of 200 lb./sq. in. for 5 minutes. The bar is found to have an impact strength of 0.53 ft. lb./in. of notch. The molded bar is hard, black and opaque. The ethylene/carbon monoxide polymer used above is prepared as follows:

A silver-lined pressure reactor is flushed with nitrogen, charged with 0.5 part of benzoyl peroxide, closed, evacuated, and pressured to 700 atms. with a mixture of carbon monoxide and ethylene containing 30% carbon monoxide. The mixture is heated to 75° C. and kept at 74°–77° C. for 9 hours while the pressure is held at 850–1000 atms. by periodic repressuring with the ethylene/carbon monoxide mixture. The reactor is cooled, bled of excess gases, and opened. The yield of polymer is 10 parts. The product is in the form of a voluminous finely divided powder which melts at 175° C.

*Example 4.*—A film 0.004 inch thick is cast from a chloroform solution of a propylene/ethylene/carbon monoxide polymer prepared as described hereinafter. The film is immersed for 30 minutes in concentrated ammonium hydroxide, cooled, and baked at 100° C. for 30 minutes. The treated film is insoluble in chloroform and has a tensile strength of 2000 lbs./sq. in with an elongation at break of 370% while the untreated film is soluble in chloroform and has a tensile strength of 1520 lbs. per sq. in. with an elongation at break of 350%. The break temperature of the treated film at 6 lbs./sq. in. is above 300° C. while that of the untreated film is 87° C. The treated film has greater durability at low temperatures and is more pliable than the untreated film. Analysis shows it to contain 0.24% nitrogen. Similar results are obtained when the film of propylene/ethylene/carbon monoxide polymer is immersed in concentrated ammonium hydroxide solution and then allowed to stand at room temperature for several hours.

The propylene/ethylene/carbon monoxide polymer used in the above experiment is prepared as follows:

A silver-lined pressure reactor is flushed with nitrogen, charged with 100 parts of benzene and 0.5 part of diethyl dioxide, closed, evacuated, charged further with 25 parts of propylene, and pressured to 300 atms. with a mixture of carbon monoxide and ethylene containing 30% carbon monoxide. The reaction mixture is heated to 130° C. and kept at 129° C.–132° C. for 17 hours while the pressure is held at 850–1000 atms. by occasional repressuring with the ethylene/carbon monoxide mixture. The product is milled on hot rubber rolls to remove the benzene. The yield of polymer is 57 parts. Analysis shows it to contain 40% carbon monoxide by weight.

*Example 5.*—A film 0.002 inch thick is cast from a chloroform solution of the propylene/ethylene/carbon monoxide polymer prepared as described in Example 4. The film is soaked for 15 minutes in a 70% aqueous solution of ethylamine, removed, and heated at 100° C. for 5 minutes. The treated film is brown, insoluble in chloroform, and somewhat rubbery. It does not break at 300° C. under a load of 12 lb./sq. in.

*Example 6.*—A film 0.004 inch thick of the propylene/ethylene/carbon monoxide polymer of Example 4 is dipped in a 5% chloroform solution of hexamethylene diamine, removed at once, and heated for 10 minutes at 100° C. The treated film is insoluble in chloroform and does not stick to a metal block heated at 180° C. whereas the untreated film is soluble in chloroform and sticks to a metal block heated at 100° C.

*Example 7.*—To 8 parts of the propylene/ethylene/carbon monoxide polymer, prepared as described hereinafter, is added on warm rubber rolls 4 parts of a 10% solution of piperazine in alcohol. A film is formed from the resulting composition by pressing for 10 minutes at 130° C. between smooth surfaces. The film is found to be clear, insoluble in chloroform and does not break at 300° C. under a load of 5 lb./sq. in. While a similar film prepared without the piperazine is soluble in chloroform and breaks at 92° C. under a load of 5 lb./sq. in.

The propylene/ethylene/carbon monoxide polymer used in the above example is made as follows:

A silver-lined pressure reactor is flushed with nitrogen, and charged with 100 parts of benzene and 0.5 part of diethyl dioxide, closed, evacuated, charged further with 56 parts of propylene and pressured to 475 atm. with a mixture of carbon monoxide and ethylene containing 70% carbon monoxide. The reaction mixture is heated to 130° C. and kept at 130 to 132° C. for 16 hours, while the pressure is held at 850–1000 atm. by occasional repressuring with the mixture of carbon monoxide and ethylene. The reactor is cooled, bled of excess gases and opened. The product is milled on warm rubber rolls to remove the benzene. The yield is 29 parts. Analysis shows it to contain 42% carbon monoxide by weight.

Although the specific examples given above pertain to polymers of carbon monoxide with ethylene alone and to polymers of carbon monoxide with ethylene and propylene, it is to be understood that in the practice of the invention any polymer of carbon monoxide with a monoolefin (e. g., ethylene, propylene, and the butylenes) alone or in conjunction with another polymerizable organic compound can be used. For example, there can be used any of the polymers of carbon monoxide disclosed and claimed in the copending applications of M. M. Brubaker, S. N. 449,765, filed July 4, 1942, now abandoned, and S. N. 552,374, filed September 1, 1944.

The materials used in the treatment of the ethylene/carbon monoxide polymers are characterized by being basic in nature. By "basic" as used herein is meant that the material in its free state shows an alkaline reaction and can react with acids to form salts. Although this invention has been illustrated with particular reference to hydrazine hydrate, meta-phenylenediamine, ammonium hydroxide, ethylamine, hexamethylenediamine, and piperazine, it is contemplated that in its practice any basic compound is operative. Thus, there can be used, primary, secondary, and tertiary amines, such as propylamine, isobutylamine, hexylamine, decylamine, octadecylamine, hexamethylenediamine, octamethylenediamine, decamethylenediamine, 1,12-diaminooctadecane, pyridine, piperidine, quinoline, etc.; aromatic amines, such as toluidine, diphenylamine, aniline, dimethylaniline, xylidines, p-phenylenediamine, alpha- and beta-naphthylamines, etc., cycloaliphatic amines such as cyclohexylamine, methylcyclohexylamine, and the like; quaternary ammonium hydroxides; inorganic basic materials, e. g., sodium potassium, and ammonium hydroxides, sodium, potassium and ammonium carbonates, sodium and potassium acetates, disodium and trisodium phosphates, etc.

The process may be operated at temperatures ranging from 20° C. to the decomposition temperature of the material being treated. It is generally preferred, however, to operate at temperatures ranging from about 50° C. to about 200° C.

The amount of basic compound added should be in excess of 1% and need not exceed about 25% by weight of the polymeric composition. The preferred range is about 2 to 20%.

The basic compound may be added to the polymer either by mixing on suitable rolls, by dissolving the components in suitable solvents, by mixing in the form of aqueous dispersions, or by simply dipping the polymer in a solution of the basic compound in a suitable solvent.

To the compositions of this invention there may be added reinforcing agents, fillers, pigments, dyes, plasticizers and the like.

The products of this invention are useful as molded articles, unsupported films, and the like.

The process of this invention provides a simple and practical way for modifying the properties of polymers of carbon monoxide with monoolefins alone and in conjunction with other polymerizable organic compounds.

I claim:

1. A process for modifying monoolefin/carbon monoxide polymers which comprises reacting a monoolefin hydrocarbon/carbon monoxide polymer with a basic compound, said polymer and basic compound being the sole reactants, at a temperature below the decomposition temperature of the said polymer, said monolefin having from 2 to 4 carbon atoms per molecule, whereby a modified monoolefin/carbon monoxide polymer is obtained.

2. A process for modifying monoolefin/carbon monoxide polymers which comprises reacting a monoolefin hydrocarbon/carbon monoxide polymer, said monoolefin having from 2 to 3 carbon atoms per molecule, at a temperature in the range of about 20° to 200° C. with 2 to 25% of a basic compound, based on the weight of the polymer, said polymer and basic compound being the sole reactants, whereby a modified monoolefin/carbon monoxide polymer is obtained.

3. A process for modifying normally soluble monoolefin/carbon monoxide polymers which comprises reacting a monoolefin hydrocarbon/carbon monoxide polymer, said monoolefin having from 2 to 3 carbon atoms per molecule, at a temperature in the range of about 20° to 200° C. with an amine, said polymer and amine being the sole reactants, whereby a modified monoolefin/carbon monoxide polymer, characterized by being substantially insoluble in chloroform, is obtained.

4. A process for modifying monoolefin/carbon monoxide polymers which comprises reacting a monoolefin hydrocarbon/carbon monoxide polymer with a basic compound, said polymer and basic compound being the sole reactants, at a temperature in the range of about 20° to 200° C., said monoolefin having from 2 to 3 carbon atoms per molecule, whereby a modified monoolefin/carbon monoxide polymer is obtained.

5. A process for modifying an ethylene/carbon monoxide polymer which comprises reacting an ethylene/carbon monoxide polymer with a basic compound, said polymer and basic compound being the sole reactants, at a temperature below the decomposition temperature of the said polymer, whereby a modified ethylene/carbon monoxide polymer is obtained.

6. A process for modifying an ethylene/carbon monoxide polymer which comprises reacting an ethylene/carbon monoxide polymer with a basic compound, said polymer and basic compound being the sole reactants, at a temperature in the range of about 20° to 200° C., whereby a modified ethylene/carbon monoxide polymer is obtained.

7. A process for modify an ethylene/carbon monoxide polymer which comprises reacting an ethylene/carbon monoxide polymer at a temperature in the range of about 20° to 200° C., with an amount of basic compound in excess of 1% by weight, based on the weight of said polymer, said polymer and basic compound being the sole reactants, whereby a modified ethylene/carbon monoxide polymer is obtained.

8. A process for modifying an ethylene/carbon monoxide polymer which comprises reacting an ethylene/carbon monoxide polymer at a temperature in the range of about 20° to 200° C. with 2 to 25% of a basic compound, based on the weight of the polymer, said polymer and basic compound being the sole reactants, whereby a modified ethylene/carbon monoxide polymer is obtained.

9. A process for modifying an ethylene/propylene/carbon monoxide polymer which comprises reacting an ethylene/propylene/carbon monoxide polymer with a basic compound, said polymer and basic compound being the sole reactants, at a temperature below the decomposition temperature of the said polymer, whereby a modified ethylene/propylene/carbon monoxide polymer is obtained.

10. A process for modifying an ethylene/propylene/carbon monoxide polymer which comprises reacting an ethylene/propylene/carbon monoxide polymer with a basic compound, said polymer and basic compound being the sole reactants, at a temperature in the range of about 20° to 200° C., whereby a modified ethylene/propylene/carbon monoxide polymer is obtained.

11. A process for modifying an ethylene/propylene/carbon monoxide polymer which consists essentially in reacting an ethylene/propylene/carbon monoxide polymer at a temperature in the range of about 20° to 200° C., with an amount of basic compound in excess of 1% by weight, based on the weight of the said polymer, whereby a modified ethylene/propylene/carbon monoxide polymer is obtained.

12. A process for modifying an ethylene/propylene/carbon monoxide polymer which comprises reacting an ethylene/propylene/carbon monoxide polymer at a temperature in the range of about 20° to 200° C. with 2 to 25% of a basic compound, based on the weight of the polymer, said polymer and basic compound being the sole reactants, whereby a modified ethylene/propylene/carbon monoxide polymer is obtained.

13. The nitrogen containing product produced in accordance with the process of claim 3.

14. A process for modifying dioxane-soluble ethylene/carbon monoxide polymers which comprises reacting the said ethylene/carbon monoxide polymer at a temperature in the range of about 20° to 200° C. with 2 to 25% of hydrazine hydrate, said polymer and hydrazine hydrate being the sole reactants, whereby a modified ethylene/carbon monoxide polymer, characterized by being insoluble in dioxane, is obtained.

15. A modified ethylene/carbon monoxide interpolymer, obtained by reacting an ethylene/carbon monoxide interpolymer with a basic material, said interpolymer and basic material being the sole reactants.

16. A modified ethylene/carbon monoxide interpolymer obtained by reacting an ethylene/carbon monoxide interpolymer with an alkali metal hydroxide, said interpolymer and alkali metal hydroxide being the sole reactants.

17. The composition set forth in claim 16 in which the alkali metal hydroxide is sodium hydroxide.

18. A modified ethylene/carbon monoxide interpolymer, obtained by reacting an ethylene/carbon monoxide interpolymer with an amine, said interpolymer and amine being the sole reactants.

19. The composition set forth in claim 18 in which the amine is a primary amine.

20. A modified ethylene/carbon monoxide interpolymer obtained by reacting an ethylene/carbon monoxide interpolymer with hydrazine hydrate, said interpolymer and hydrazine hydrate being the sole reactants.

SAMUEL L. SCOTT.

REFERENCES CITED

The following references are of record in the file of this patent:

UNITED STATES PATENTS

| Number | Name | Date |
|---|---|---|
| 2,304,637 | Hardy | Dec. 8, 1942 |
| 2,351,120 | Hanford | June 13, 1944 |